US012629588B2

(12) United States Patent (10) Patent No.: US 12,629,588 B2
Timmins et al. (45) Date of Patent: May 19, 2026

(54) CONTROLLER STATE MANAGEMENT FOR CLIENT-SERVER NETWORKING

(71) Applicant: Bungie, Inc., Bellevue, WA (US)

(72) Inventors: Luke Timmins, Bellevue, WA (US); Gregory Peng, Bellevue, WA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 226 days.

(21) Appl. No.: 18/281,282

(22) PCT Filed: Mar. 9, 2022

(86) PCT No.: PCT/US2022/019651
§ 371 (c)(1),
(2) Date: Sep. 8, 2023

(87) PCT Pub. No.: WO2022/192474
PCT Pub. Date: Sep. 15, 2022

(65) Prior Publication Data
US 2024/0173616 A1 May 30, 2024

Related U.S. Application Data

(60) Provisional application No. 63/158,965, filed on Mar. 10, 2021.

(51) Int. Cl.
*A63F 13/2145* (2014.01)
*A63F 13/355* (2014.01)
*A63F 13/426* (2014.01)
(52) U.S. Cl.
CPC ........ *A63F 13/2145* (2014.09); *A63F 13/355* (2014.09); *A63F 13/426* (2014.09)
(58) Field of Classification Search
CPC ..... A63F 13/214; A63F 13/2145; A63F 13/42
See application file for complete search history.

(56) References Cited

U.S. PATENT DOCUMENTS 7,254,775 B2 * 8/2007 Geaghan ............... G06F 3/0488
715/701
8,062,115 B2 * 11/2011 Thomas .................. G07F 17/32
463/31

(Continued)

FOREIGN PATENT DOCUMENTS

AU 2022234766 10/2023
CA 3212951 9/2022

(Continued)

OTHER PUBLICATIONS

International Patent Application No. PCT/US2022/019651, International Search Report and Written Opinion mailed Jun. 16, 2022, 10 pages.

(Continued)

*Primary Examiner* — Chase E Leichliter
(74) *Attorney, Agent, or Firm* — Kilpatrick Townsend & Stockton LLP

(57) ABSTRACT

Described herein are techniques for transmitting state data between a controller and another electronic device. In embodiments, such techniques may comprise receiving, at a user device, input that relates to a first action to be performed by an avatar; providing, to a second electronic device, a first set of state data generated from the received input over a first communication channel; and determining a user intent that relates to a second action to be performed by the avatar. Based on the user intent, a second set of state data can be generated that is different from the first set of state data and includes less than all available state data. The second set of state data can be provided to the second device over a second communication channel, causing the avatar to perform a modified action.

20 Claims, 6 Drawing Sheets

(56)  References Cited

U.S. PATENT DOCUMENTS

| | | | | |
|---|---|---|---|---|
| 8,222,507 | B1* | 7/2012 | Salazar | G10H 1/0033 |
| | | | | 84/602 |
| 8,246,459 | B2* | 8/2012 | Ryu | A63F 13/2145 |
| | | | | 463/36 |
| 8,269,736 | B2* | 9/2012 | Wilairat | G06F 3/04883 |
| | | | | 345/173 |
| 8,512,115 | B2* | 8/2013 | Namba | A63F 13/537 |
| | | | | 463/31 |
| 8,519,965 | B2* | 8/2013 | Cady | G06F 3/0446 |
| | | | | 178/18.05 |
| 8,954,890 | B2* | 2/2015 | Haussila | G06F 3/0488 |
| | | | | 715/810 |
| 9,146,674 | B2* | 9/2015 | Karlsson | G06F 3/04886 |
| 9,317,197 | B2* | 4/2016 | Takuma | G06F 3/04883 |
| 10,831,258 | B2* | 11/2020 | Tanzawa | A63F 13/426 |
| 11,058,948 | B1* | 7/2021 | Hardiman | A63F 13/798 |
| 11,119,564 | B2* | 9/2021 | Tanzawa | A63F 13/426 |
| 2003/0017863 | A1* | 1/2003 | Takahashi | A63F 13/42 |
| | | | | 463/3 |
| 2004/0248650 | A1* | 12/2004 | Colbert | A63F 3/00643 |
| | | | | 463/37 |
| 2005/0057524 | A1* | 3/2005 | Hill | G06F 3/0421 |
| | | | | 345/173 |
| 2005/0202869 | A1* | 9/2005 | Miyamoto | A63F 13/2145 |
| | | | | 463/36 |
| 2005/0227217 | A1* | 10/2005 | Wilson | G06V 10/10 |
| | | | | 434/337 |
| 2006/0010400 | A1* | 1/2006 | Dehlin | G06V 40/28 |
| | | | | 715/856 |
| 2006/0025218 | A1* | 2/2006 | Hotta | A63F 13/57 |
| | | | | 463/37 |
| 2006/0097991 | A1* | 5/2006 | Hotelling | G06F 3/04164 |
| | | | | 345/173 |
| 2006/0112335 | A1* | 5/2006 | Hofmeister | G06F 3/0488 |
| | | | | 715/701 |
| 2006/0197753 | A1* | 9/2006 | Hotelling | G06F 3/016 |
| | | | | 345/173 |
| 2006/0258453 | A1* | 11/2006 | Kando | A63F 13/52 |
| | | | | 463/36 |
| 2007/0060335 | A1* | 3/2007 | Sakaguchi | A63F 13/45 |
| | | | | 463/30 |
| 2007/0252821 | A1* | 11/2007 | Hollemans | G06F 3/0488 |
| | | | | 345/173 |
| 2008/0132333 | A1* | 6/2008 | Kogo | G07F 17/3211 |
| | | | | 345/173 |
| 2008/0165141 | A1* | 7/2008 | Christie | G06F 3/0482 |
| | | | | 345/173 |
| 2008/0180406 | A1* | 7/2008 | Han | G06F 3/04883 |
| | | | | 345/173 |
| 2008/0274780 | A1* | 11/2008 | Yamada | A63F 13/70 |
| | | | | 463/11 |
| 2008/0297482 | A1* | 12/2008 | Weiss | G06F 3/041 |
| | | | | 345/173 |
| 2008/0297492 | A1* | 12/2008 | Shirakawa | G06F 3/0486 |
| | | | | 345/179 |
| 2009/0051114 | A1* | 2/2009 | Robbers | A63F 1/00 |
| | | | | 273/293 |
| 2009/0054124 | A1* | 2/2009 | Robbers | G07F 17/3293 |
| | | | | 463/9 |
| 2009/0122018 | A1* | 5/2009 | Vymenets | G06F 3/0488 |
| | | | | 345/173 |
| 2009/0181770 | A1* | 7/2009 | Viner | A63F 13/2145 |
| | | | | 463/43 |
| 2009/0327975 | A1* | 12/2009 | Stedman | G06F 3/04883 |
| | | | | 715/863 |
| 2010/0053093 | A1* | 3/2010 | Kong | G06F 3/045 |
| | | | | 345/173 |
| 2010/0066704 | A1* | 3/2010 | Kasai | A63F 13/213 |
| | | | | 345/175 |
| 2010/0083111 | A1* | 4/2010 | de los Reyes | G06F 3/04886 |
| | | | | 715/702 |

| | | | | |
|---|---|---|---|---|
| 2010/0141680 | A1* | 6/2010 | Nashida | G06F 3/04842 |
| | | | | 345/173 |
| 2010/0162181 | A1* | 6/2010 | Shiplacoff | G06F 3/04883 |
| | | | | 345/173 |
| 2010/0277419 | A1* | 11/2010 | Ganey | G06F 3/0481 |
| | | | | 345/173 |
| 2010/0285881 | A1* | 11/2010 | Bilow | A63F 9/24 |
| | | | | 463/37 |
| 2010/0287486 | A1* | 11/2010 | Coddington | G06F 3/0486 |
| | | | | 715/823 |
| 2010/0321319 | A1* | 12/2010 | Hefti | G06F 3/04883 |
| | | | | 345/173 |
| 2011/0009195 | A1* | 1/2011 | Porwal | A63F 13/533 |
| | | | | 463/37 |
| 2011/0014983 | A1* | 1/2011 | Miller, IV | G06F 3/0488 |
| | | | | 463/43 |
| 2011/0130182 | A1* | 6/2011 | Namba | A63F 13/812 |
| | | | | 463/3 |
| 2011/0169762 | A1* | 7/2011 | Weiss | G06F 3/041 |
| | | | | 345/173 |
| 2011/0172013 | A1* | 7/2011 | Shirasaka | A63F 13/92 |
| | | | | 345/173 |
| 2011/0205169 | A1* | 8/2011 | Yasutake | G06F 3/04883 |
| | | | | 345/173 |
| 2012/0026100 | A1* | 2/2012 | Migos | G06F 3/0412 |
| | | | | 345/173 |
| 2012/0034978 | A1* | 2/2012 | Lim | A63F 13/335 |
| | | | | 463/36 |
| 2012/0050262 | A1* | 3/2012 | Kim | H04N 13/128 |
| | | | | 345/419 |
| 2012/0066627 | A1* | 3/2012 | Furukawa | G06F 3/0488 |
| | | | | 715/768 |
| 2012/0169610 | A1* | 7/2012 | Berkes | G06F 3/04166 |
| | | | | 345/173 |
| 2012/0179963 | A1* | 7/2012 | Chiang | G06F 3/01 |
| | | | | 345/173 |
| 2012/0212420 | A1* | 8/2012 | Shin | G06F 3/04883 |
| | | | | 345/173 |
| 2012/0218203 | A1* | 8/2012 | Kanki | G06F 3/0488 |
| | | | | 345/173 |
| 2012/0274585 | A1* | 11/2012 | Telfer | G06F 3/0488 |
| | | | | 345/173 |
| 2012/0306775 | A1* | 12/2012 | Miyachi | A63F 13/2145 |
| | | | | 345/173 |
| 2013/0007096 | A1* | 1/2013 | Pahlavan | H04L 43/0864 |
| | | | | 709/202 |
| 2013/0038532 | A1* | 2/2013 | Okura | A63F 13/40 |
| | | | | 345/158 |
| 2013/0058019 | A1* | 3/2013 | Lee | G06F 3/04883 |
| | | | | 361/679.01 |
| 2013/0120258 | A1* | 5/2013 | Maus | A63F 13/2145 |
| | | | | 345/161 |
| 2013/0120293 | A1* | 5/2013 | Jeon | G06F 3/01 |
| | | | | 345/173 |
| 2013/0120295 | A1* | 5/2013 | Kim | G06F 3/0486 |
| | | | | 345/173 |
| 2013/0139079 | A1* | 5/2013 | Kitao | G06F 3/0488 |
| | | | | 715/764 |
| 2013/0141373 | A1* | 6/2013 | Takuma | G06F 3/04883 |
| | | | | 345/173 |
| 2013/0154959 | A1* | 6/2013 | Lindsay | G06F 1/1694 |
| | | | | 345/173 |
| 2013/0167062 | A1* | 6/2013 | Herring | G06F 3/04883 |
| | | | | 715/764 |
| 2013/0169559 | A1* | 7/2013 | Peng | G06F 3/0416 |
| | | | | 345/173 |
| 2013/0205208 | A1* | 8/2013 | Kim | G11B 27/034 |
| | | | | 715/716 |
| 2013/0215059 | A1* | 8/2013 | Lim | G06F 3/01 |
| | | | | 345/173 |
| 2013/0263029 | A1* | 10/2013 | Rossi | G06F 9/451 |
| | | | | 715/764 |
| 2013/0275868 | A1* | 10/2013 | Haussila | A63F 13/28 |
| | | | | 715/810 |
| 2013/0285924 | A1* | 10/2013 | Griffin | G06F 3/04812 |
| | | | | 345/173 |

(56)          References Cited

U.S. PATENT DOCUMENTS

| | | | | |
|---|---|---|---|---|
| 2013/0316813 | A1* | 11/2013 | Derome | A63F 13/2145 463/31 |
| 2013/0316817 | A1* | 11/2013 | Tanzawa | G06F 3/0481 463/31 |
| 2013/0316829 | A1* | 11/2013 | Derome | G07F 17/3211 463/37 |
| 2013/0321340 | A1* | 12/2013 | Seo | G06F 3/0486 345/174 |
| 2013/0331182 | A1* | 12/2013 | Tanzawa | A63F 13/2145 463/31 |
| 2014/0207622 | A1* | 7/2014 | Vijayaraghavan | G06Q 30/0201 705/26.62 |
| 2015/0072784 | A1* | 3/2015 | Lee | A63F 13/2145 463/31 |
| 2015/0113477 | A1* | 4/2015 | Haussila | G06F 3/0488 715/810 |
| 2015/0169067 | A1* | 6/2015 | Hong | G06F 3/04842 715/863 |
| 2017/0304730 | A1* | 10/2017 | Bronstein Bendayan | A63F 13/35 |
| 2017/0340959 | A1* | 11/2017 | Tang | G06F 3/0488 |
| 2018/0011529 | A1* | 1/2018 | Tanzawa | A63F 13/2145 |
| 2018/0157372 | A1* | 6/2018 | Kurabayashi | G06F 3/04886 |
| 2018/0161674 | A1* | 6/2018 | Kohara | A63F 13/52 |
| 2019/0255442 | A1 | 8/2019 | Broadway et al. | |
| 2019/0339765 | A1* | 11/2019 | Tanzawa | A63F 13/822 |
| 2020/0122032 | A1* | 4/2020 | Matsui | A63F 13/2145 |
| 2020/0155941 | A1* | 5/2020 | Ito | G06F 3/0412 |
| 2020/0174618 | A1* | 6/2020 | Wang | G06F 3/0488 |
| 2020/0282308 | A1* | 9/2020 | Guo | A63F 13/537 |
| 2023/0092439 | A1* | 3/2023 | Dang | A63F 13/35 463/37 |
| 2024/0149147 | A1* | 5/2024 | Peng | A63F 13/537 |
| 2024/0173616 | A1* | 5/2024 | Timmins | A63F 13/42 |

FOREIGN PATENT DOCUMENTS

| | | |
|---|---|---|
| CN | 116981505 | 10/2023 |
| EP | 4291315 | 12/2023 |
| IL | 305750 | 11/2023 |
| JP | 2019-535156 | 12/2019 |
| JP | 2024-512346 | 3/2024 |
| KR | 20200099913 A | 8/2020 |
| MX | MX/a/2023/010556 | 9/2023 |
| WO | WO 2019/245681 | 12/2019 |
| WO | WO 2020/252400 | 12/2020 |
| WO | WO 2021/101811 | 5/2021 |
| WO | WO 2022/192474 | 9/2022 |

OTHER PUBLICATIONS

Australian Application No. 2022234766, First Examination Report dated Jul. 11, 2024.

European Application No. 22767948.7, Extended European Search Report dated Jul. 18, 2024.

Canadian Application No. 3,212,951, First Examiner's Report dated Dec. 2, 2024.

UAE Application No. P6002252/2023, Examination Report and Search Report dated Dec. 12, 2024.

Australian Application No. 2022234766, Second Examination Report dated Oct. 30, 2024.

Japanese Application No. 2023-553751, Non-Final Notification of Reasons for Refusal dated Oct. 8, 2024.

PCT Application No. PCT/US2022/019651, International Preliminary Report on Patentability dated Sep. 21, 2023.

P6002252/2023, Luke Timmins, Controller State Management for Client-Server, Sep. 7, 2023.

2022234766, Luke Timmins, Controller State Management for Client-Server, Sep. 19, 2023.

3,212,951, Luke Timmins, Controller State Management for Client-Server, Sep. 8, 2023.

20228002101643, Luke Timmins, Controller State Management for Client-Server Networking, Sep. 8, 2023.

22767948.7, Luke Timmins, Controller State Management for Client-Server Networking, Sep. 15, 2023.

305750, Luke Timmins, Controller State Management for Client-Server Networking, Sep. 7, 2023.

2023-553751, Luke Timmins, Controller State Management for Client-Server Networking, Sep. 4, 2023.

MX/a/2023/010556, Luke Timmins, Controller State Management for Client-Server Networking, Sep. 7, 2023.

803835, Luke Timmins, Controller State Management for Client-Server Networking, Sep. 19, 2023.

PCT/US2022/019651, Luke Timmins, Controller State Management for Client-Server Networking, Mar. 9, 2022.

2023125000, Luke Timmins, Controller State Management for Client-Server Networking, Sep. 29, 2023.

523450618, Luke Timmins, Controller State Management for Client-Server Networking, Sep. 10, 2023.

* cited by examiner

600

602

RECEIVE TOUCH INPUT FROM A USER

604

PROVIDE A FIRST SET OF STATE DATA GENERATED FROM THE TOUCH INPUT OVER A FIRST COMMUNICATION CHANNEL

606

DETERMINE USER INTENT BASED ON THE RECEIVED TOUCH INPUT

608

GENERATE A SECOND SET OF STATE DATA BASED ON THE USER INTENT

610

PROVIDE A SECOND SET OF STATE DATA GENERATED FROM THE TOUCH INPUT OVER A FIRST COMMUNICATION CHANNEL

CONTROLLER STATE MANAGEMENT FOR CLIENT-SERVER NETWORKING

BACKGROUND

Modern computer controller systems, such as those used by computer and video games, as well as by general-use operating systems, employ a variety of techniques to network controller data within requests between a client and server machine for online gaming. Complex networking solutions exist for computer or console/server communication for first-person games (e.g., the DESTINY and DESTINY 2 series) as described in U.S. Pat. Nos. 8,632,409 and 8,823,701. However, the problems inherent in implementing controller data networking differ when considering gaming engines that are isometric as opposed to first-person, and when considering computing environments in which a greater share of the computing power is server-side as opposed to client side. Therefore, improved networking implementations to support thin-client gaming and varied perspective gaming are needed.

SUMMARY

Techniques are provided herein for facilitating communication between a controller and another electronic device (e.g., a server or console). In such techniques, when user input is received, a first set of state data may be provided by the controller via a first communication channel. The controller may determine a predicted user intent based on the received user input. Based on the predicted user intent, a second set of state data is provided by the controller via a second communication channel.

In one embodiment, a method is disclosed as being performed by a user device, the method comprising receiving, at a controller device, touch input from a user of the controller device, providing, to a second electronic device, a first set of state data generated from the received touch input over a first communication channel, determining, based on the received touch input, a user intent, generating, based on the user intent, a second set of state data, and providing, to the second electronic device, a second set of state data generated from the received touch input over a second communication channel different from the first communication channel.

An embodiment is directed to a computing system comprising a touchscreen display, a processor; and a memory including instructions that, when executed with the processor, cause the computing device to, at least receive touch input from a user of the user device, provide, to a second electronic device, a first set of state data generated from the received touch input over a first communication channel, determine, based on the received touch input, a user intent, generate, based on the user intent, a second set of state data, and provide, to the second electronic device, a second set of state data generated from the received touch input over a second communication channel different from the first communication channel.

An embodiment is directed to a non-transitory computer-readable media collectively storing computer-executable instructions that upon execution cause one or more computing devices to collectively perform acts comprising receiving, at a controller device, touch input from a user of the controller device, providing, to a second electronic device, a first set of state data generated from the received touch input over a first communication channel, determining, based on the received touch input, a user intent, generating, based on the user intent, a second set of state data, and providing, to the second electronic device, a second set of state data generated from the received touch input over a second communication channel different from the first communication channel.

An embodiment is directed to methods for receiving, at a user device, input from a user of the user device that relates to a first action to be performed by an avatar: providing, to a second electronic device, a first set of state data generated from the received input over a first communication channel; and determining, based on the received input, a user intent that relates to a second action to be performed by the avatar that differs from the first action. The methods can further include generating, based on the user intent, a second set of state data that is different from the first set of state data and including less than all available state data; providing, to the second electronic device, the second set of state data over a second communication channel different from the first communication channel; and causing the avatar to perform a modified action that differs from the first action based on the first and second sets of state data. The user intent may include any of an interrupt that prevents the first action being performed by the avatar, a modification to the first action to be performed by the avatar, or a second action to be performed subsequent to the first action to be performed by the avatar. The first set of state data can include a predetermined set of data values and the second set of state data can include a set of data values selected based on the user intent, which may be inferred from the received input, and require less bandwidth to transmit that the first set of state data.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
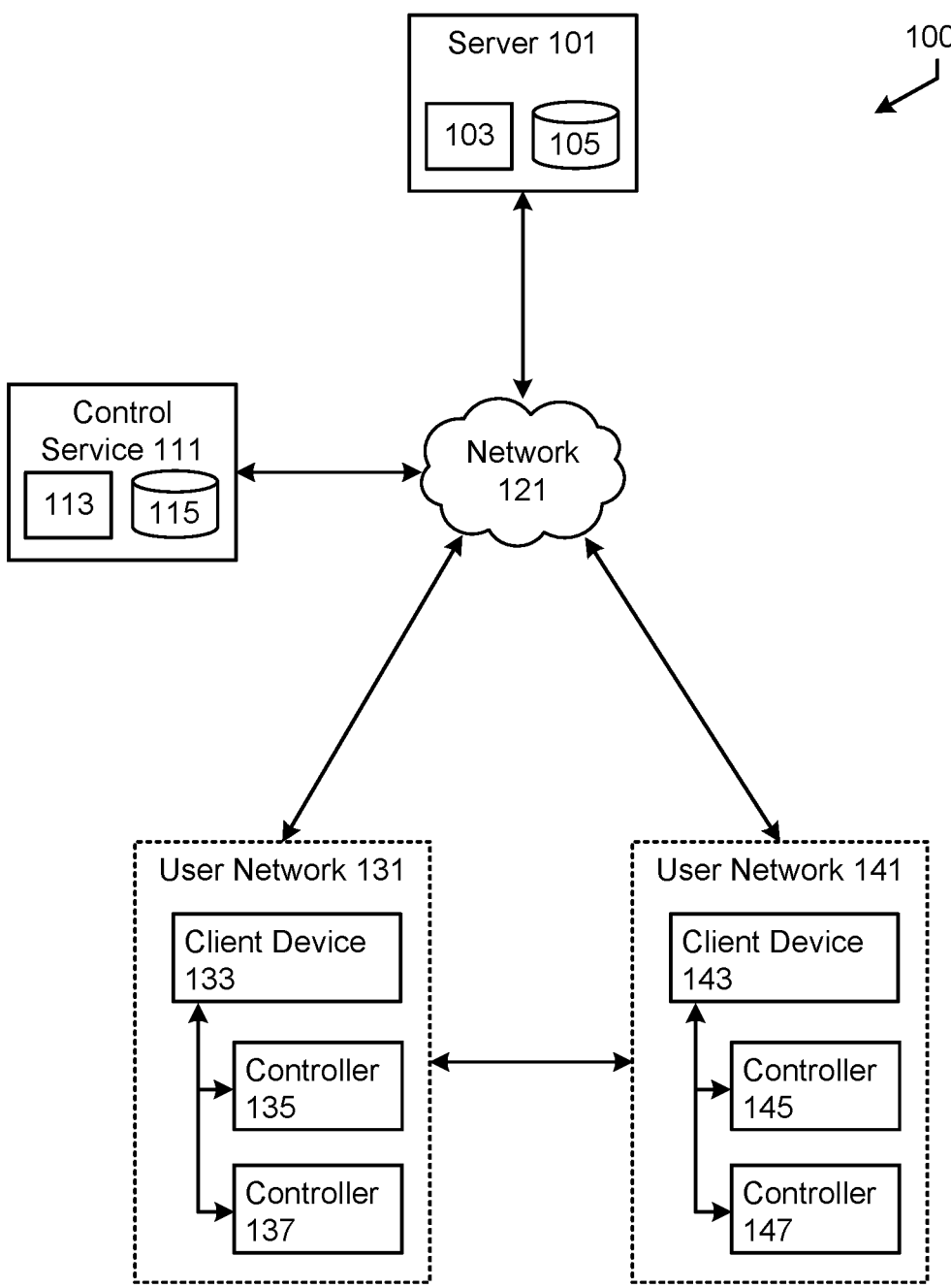
FIG. 1 is a simplified system diagram illustrating a service environment in which a virtual controller can be used, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to techniques for implementing communication protocols for use with a controller (e.g., a virtual controller). Particularly, the techniques are directed toward communicating additional state data between a controller and a server while minimizing bandwidth used. In such techniques, typical movement data is communicated over a first communication channel. Additionally, a user's "intent" is determined by the controller to identify state data that is most likely relevant to the next user action. Based on the predicted intent, the controller may communicate a set of state data related to that intent via a second communication channel.

In a conventional client-server networking model (e.g., see the published Unreal 3 networking docs https://docs.unrealengine.com/udk/Three/NetworkingOverview.html, which is based on the Tribes Networking Model (https://www.gamedevs.org/uploads/tribesnetworking-model.pdf)), for a given set of machines that want to experience a synchronous multiplayer experience together, there is one machine (the "server") who has authoritative networked "state" (ex. position and health of avatars, score of the game, etc.) that is transmitted to "client" machines.

For a "client" machine to move their controlled avatar on the "server" (which will then send the authoritative updated state to all the connected clients in the multiplayer experience), a "move request" is built from the player's input (ex. controller and button state), the "move request" is executed on the client's machine immediately (called "client side prediction", this allows the client to non-authoritatively change state on their local controlled avatar to make input feel responsive).

Some of the resultant state of the "move request" is captured (ex. the ending position of the avatar after the move is performed) and transmitted to the "server" along with the "move request". The server then runs the "move request" against the authoritative state of the avatar and compares the resulting state. If it matches what the client sent, the move is "allowed" and the server sends an acknowledgment, and if it's disallowed the server sends a "correction" to the client containing the authoritative state of the avatar.

Embodiments of the disclosure provide for a number of advantages over conventional systems. Particularly, for many standard implementations of the above networking model, the "move request" state contains enough "raw" analog input state to perform basic operations (e.g., moves), but typically lacks enough raw data to perform any enhanced operations. In many cases, the state data that is communicated between client and server is often limited based on the "game engine" that is implemented. By way of illustration, the Unreal Engine 4 implementation contains an acceleration vector for the avatar, which is derived from the analog thumbstick state, but state other than that acceleration vector is often lost. Embodiments of the disclosure provide for the ability to communicate additional state data while adhering to bandwidth limitations.

Making controls accessible to users across many platforms typically requires decoupling implementation from any singular controller so that implementations can be readily translated to multiple controller types, to customizable controllers, or even to virtual controllers (e.g., touchscreen devices embedded in controllers or replacing controllers). For games implemented on a flat screen with no physical buttons, for example, player intent may be tied to an almost arbitrary range of potential inputs. For example, the player's input of how strongly they are gesturing in a direction (ex. rapidly swiping in the opposite direction from the movement direction of their avatar) is important from an "intent" point of view to make certain avatar actions and movement feel responsive to the player's desires. However, state data that includes such information is often not included in communications between the client device and the server. In such cases, the system is unable to accurately respond to user input in a way that it could if it was provided the full state data. In some cases, a wide variety of different state data may be made available by a client for transmission to the server, but the amount of data that can be sent may be limited based on bandwidth.

Embodiments of the disclosure may be advantageous over conventional systems in that additional state data can be provided from the client to the server, allowing for greater responsiveness to user input. By way of illustration, some nonlimiting examples of additional state data to be communicated might include an input vector, input deflection, input change, or any other suitable state data.

For the purposes of this disclosure, the following terms are defined:

Input Vector—"raw" virtual joystick input values, converted to a 2D vector, processed with inner and outer "dead zones" which can be used to smooth lossy analog values.

Input Deflection—the magnitude of the Input Vector

Input Change—certain patterns or abrupt changes in input can be tracked over time by remembering past inputs. For example, if a "U-turn" is detected on a virtual controller based on a rapid change in user input, the first input and second input can be tracked and used to compute a parameter of the change in inputs, which can be tracked as an input in its own right. An input change may be stored as additional vector, such as a direction and magnitude of the change between the first and second inputs. Patterns for input changes other than directions can also be tracked. For example, rapid changes between pressing one button and pressing another can be tracked as an additional input, or the behavior of a second button press can be modified based on a previously registered button input or pattern of button inputs.

A virtual controller, as opposed to a physical controller, may be any suitable electronic device on which at least some of the control input mechanisms are instantiated virtually. For example, a virtual controller may include a touchscreen display that is configured to present a button or other input mechanism. A user's touch on the touchscreen display may be detected during the use of the virtual controller. If a location of the detected user's touch corresponds to a location of the presented button, then the button may be activated.

Receiving additional state allows for a server to adjust movement actions based on perceived user intent. For example, a determination may be made as to "does the user want to grab on to a ledge?" Conventional approaches to determining this type of user intent may use such data as the direction of movement or facing vector of an avatar, but such approaches can misread player intent, especially when state data has been lost. Using the context-based approaches of the present disclosure, an actual virtual joystick state (ex. "the player has just snapped their thumb towards the ledge") can be used to deduce that a player wants their avatar to grab on to the ledge, making for a more intuitive, responsive, pleasant, and forgiving control scheme for the player.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., consolespecific controllers, cross-compatible controllers, or virtual controllers) with connectivity hardware and protocols for communicating with their respective client device 133. According to some embodiments, controller 135 can be a virtualized controller operating on a thin-client device or touchscreen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
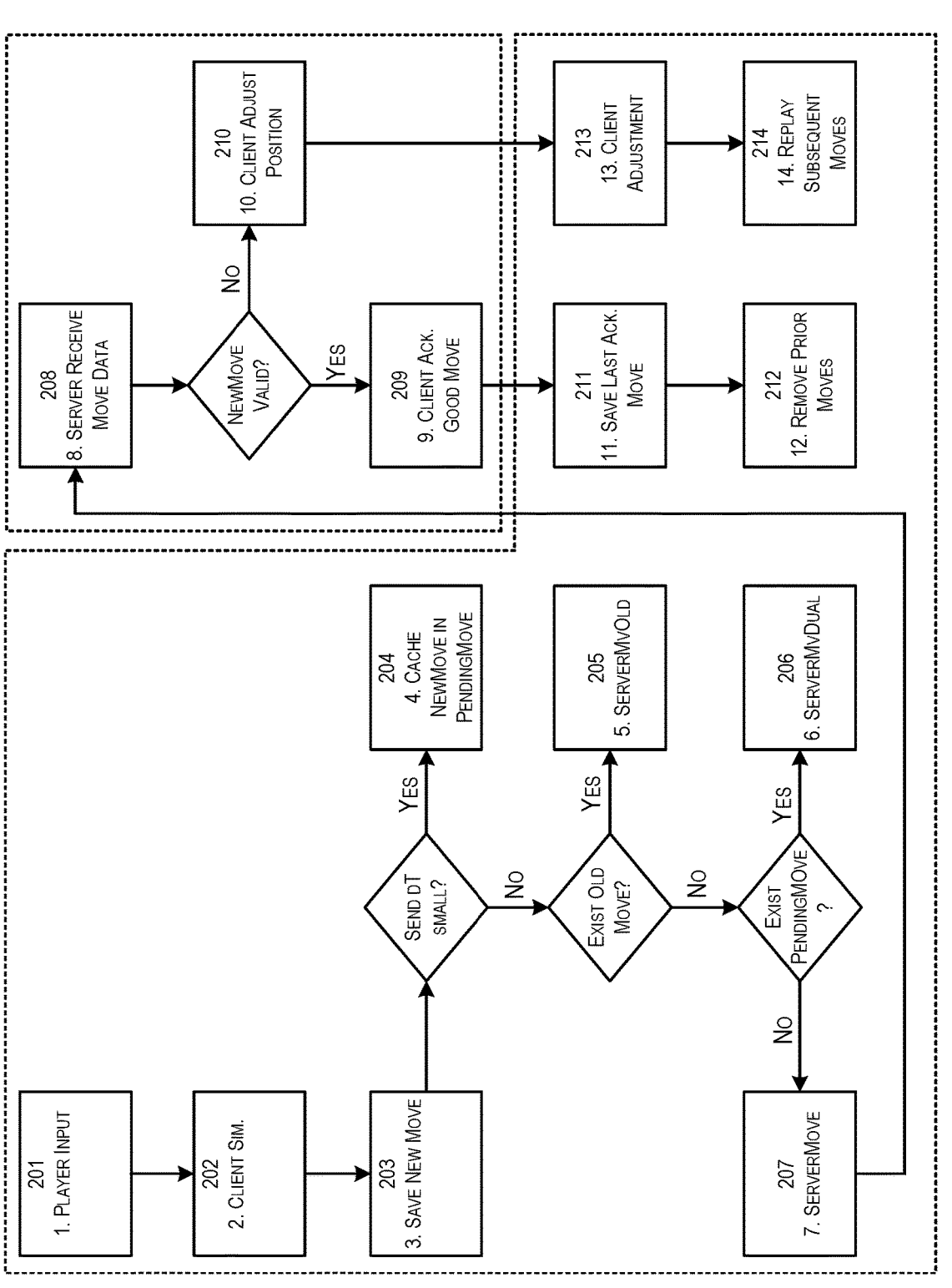
FIG. 2 depicts an illustrative example of an environment that includes a virtual controller in which an approach to networking controller data between a client and server machine for online gaming may be implemented in accordance with embodiments.

FIG. 2 depicts an illustrative example of an environment 200 that includes a virtual controller in which an approach to networking controller data between a client and server machine for online gaming may be implemented in accordance with embodiments. Any suitable service environment or system can be used to enable the example approach, e.g., the service environment 100 of FIG. 1.

In accordance with various embodiments, player input can be received (201) via player manipulation of a controller. The client device can begin to simulate the movement or action of the in-game avatar, and generates resulting information such as a final position, (i.e., the "move,") responsive to the player input (202). In conjunction with simulating the responsive action, the system also saves the player input and/or the resulting "move" designated by the input (203).

Subsequent moves can be made after the initial move and are iteratively saved in the same manner. The service monitors the strength of an input, e.g., the "send time," or "send dT," and if the strength is smaller than a threshold the service can cache a parameter of the input as a variable, i.e., a pending move (204). Subsequent moves that also fall below the threshold can add to or replace the pending move variable.

When the strength of an input is greater than the threshold, the service queries whether an old move exists in memory, and if so, transmits the old move (205) for receipt by the server (208). When an old move does not exist in memory, the service queries whether a pending move exists in memory. When yes, the service sends both the new move and pending move (206) for receipt by the server (208). Otherwise, the service sends the new move to the server (207).

Upon receipt of the movement instructions by the server (208), the service on the server side runs the player input (201) to determine an authoritative state of the player's in-game avatar, and compares this authoritative state to the "move," (i.e., the client-generated information (203) about the result of the player input (201)). When the authoritative state matches the move (i.e., when the move is valid), the server acknowledges the "move" (209) and upon receipt of acknowledgement, the client device saves the last acknowledged move (211) and removes from memory moves that preceded the last acknowledged move (212).

When the authoritative state does not match the client-generated state of the in-game avatar, the server calculates an adjustment to the client-generated state (210) and communicates the adjustment to the client device (213). The client device then replays the movements so that the authoritative state and client-generated states match (214).

Figure 3:
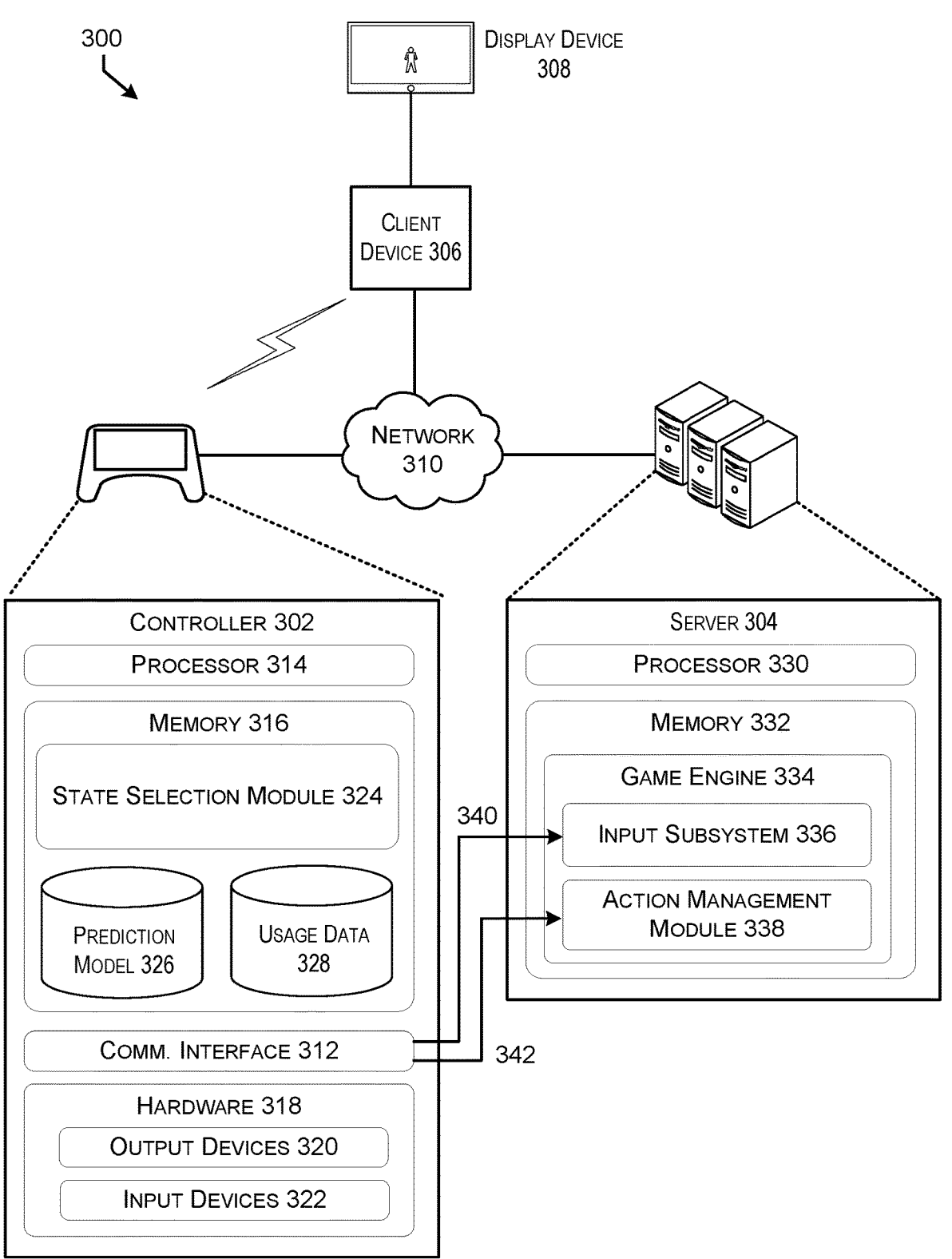
FIG. 3 is a block diagram showing various components of a computing system architecture that supports implementation of a virtualized physical controller in accordance with embodiments.

FIG. 3 is a block diagram showing various components of a computing system architecture that supports implementation of a virtualized physical controller in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display device 308. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities. The controller 302 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, touchscreens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to predict a user's likely intent and subsequently identify additional state data to be provided to another device (e.g., state selection module 324).

Additionally, the memory 316 may include various data stores. For example, the memory 316 may maintain a prediction model 326 as well as historical user input/action data (e.g., usage data 328). In this example, the prediction model may be a trained machine learning model that has been trained to correlate received user input with likely user intent. In some cases, such a prediction model may be trained based on the historic user input/action data for the user.

The state selection module 324 may be configured to, in conjunction with the processor 314, predict a likely user intent. Based on the predicted intent, the state selection module 324 may be configured to identify additional state data (e.g., state data that has not already been provided) that is relevant to the predicted intent. The state selection module 324 may then be configured to communicate the additional state data to another electronic device via a communication channel. In some cases, this may involve creating a communication channel that is separate from an existing communication channel over which initial state data has been provided.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rackmounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The server 304 may include one or more processors 330 and memory 332. The one or more processors 330 and the memory 332 of the controller may implement functionality that includes one or more software modules and data stores. Such software modules may include routines, program instructions, objects, and/or data structures that are executed by the processors 330 to perform particular tasks or implement particular data types. More particularly, the memory 332 may include a game engine 334 configured to track and provide game state data to the controller 302.

The game engine 334 may include software instructions configured to facilitate interactions between one or more player avatars and a virtual environment. In some cases, the software instructions may be made up of a number of different components, including at least an input system 336 and an action management module 338.

The input system 336 may be a component of the game engine that is configured to receive a predetermined set of state data from a controller and translate that predetermined set of state data into an action (e.g., a movement) for an avatar associated with the controller to perform. In some embodiments, a first active communication channel 340 may be maintained between the controller 302 and the server 304 over which the predetermined set of state data may be transmitted.

The action management module 338 may be a component of the game engine that is configured to received additional state data from the controller and to determine, based on that state data, one or more actions to be completed. The additional state data may be received from the controller via a second communication channel 342. In some embodiments, the action management module may be configured to alter or augment an action indicated to be performed by the input subsystem 336. For example, whereas a type of action (e.g., movement, attack, etc.) to be performed by the avatar may be determined based on the predetermined set of state data received by the input subsystem, a degree or amount of that action may be determined based on additional state data received by the action management module 338.

By way of illustration, consider an example in which a predetermined set of state data provided to the input subsystem includes an input vector to be attributed to a movement to be made by an avatar. In this example, the additional state data may indicate an amount of pressure applied to a directional pad and/or speed of interaction. In this example, the movement indicated by the input subsystem may be adjusted based on a velocity or speed of the movement.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game). It should be noted that while a number of components are described as being included in the server 304 (e.g., game engine 334), such components might actually be included in the client device instead. In such cases, one skilled in the art would recognize that the functionality attributed to the server may be performed by the client device instead, and that the client device would be an equivalent of the server in those cases.

Figure 4:
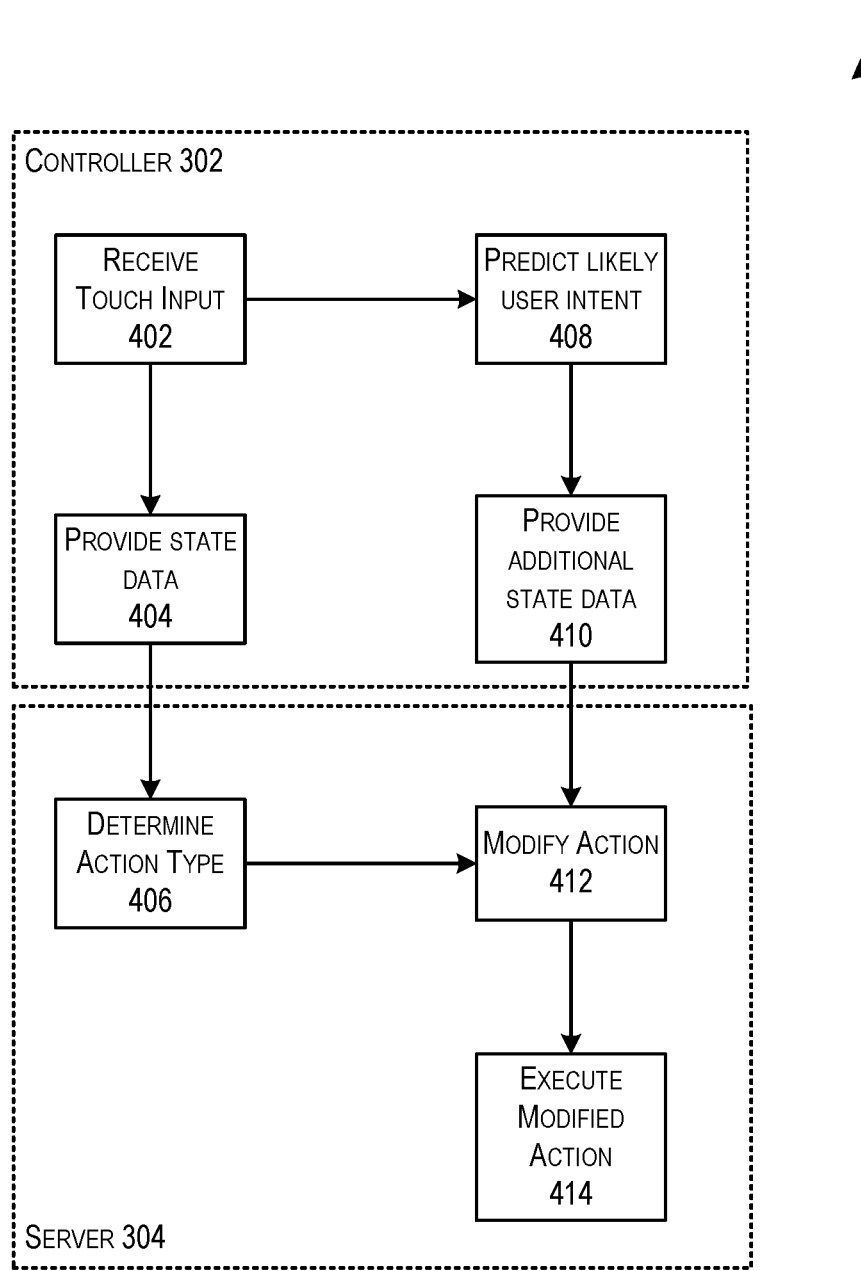
FIG. 4 depicts a block diagram illustrating a process for executing a modified action in response to receiving touch input in accordance with embodiments.

FIG. 4 depicts a block diagram illustrating a process for executing a modified action in response to receiving touch input in accordance with embodiments. The process 400 may be performed by the system described in FIG. 3 above. For example, a first portion of the process may be performed by a controller (e.g., controller 302) and a second portion of the process may be performed by a server (e.g., server 304). In some cases, the controller may be a user device upon which a virtual physical controller has been implemented.

At 402, the process 400 may involve receiving touch input from a user. The touch input may include a selection of a button or other input mechanism. In some cases, a degree or amount for the touch input may be detected. For example, a speed of the user's touch, an amount of pressure, and/or a distance from the center of the input mechanism may be detected.

At 404, the process 400 may involve providing a predetermined set of state data to the server. In some embodiments, the predetermined set of state data may be transmitted to the server over a first communication channel. For example, in some cases, the predetermined set of state data may include an input vector that includes a direction.

At 406, the process 400 may involve determining a type of action to be performed by an avatar. In some cases, the type of action may be selected from a set of actions available to be performed by the avatar based on the type of touch input received. In some cases, the action type may be dependent upon the predetermined set of state data. For example, the predetermined set of state data may include an input vector indicating a direction of travel. In this example, an action type may be identified as a movement in the indicated direction.

At 408, the process 400 may involve predicting a likely user intent. In some cases, the predicted likely user intent may be determined based on factors (e.g., a degree or amount) associated with the received user input. For example, each of a number of different user intents may correspond to a range of values for various factors. In some embodiments, the user intent may be determined by providing the received touch input to a machine learning model that has been trained to correlate user touch input with user intent. In some cases, a user's intent may be to perform an augmented or modified version of an action. In some cases, the user's intent may be to perform a subsequent action following an action currently being performed. In such cases, the subsequent action may be predicted based on the user's tendency to perform that action following the user providing the received user touch input.

At 410, the process 400 may involve identifying additional state data that relates to the predicted user intent. For example, where a user intent is determined to be an intent to perform an action, the process may involve identifying one or more data values indicated as being related to the action associated with the intent. The data values may represent state data generated from the received touch input that is not provided to the server at 404. For example, upon detecting a touch input provided by a user, a variety of state data may be generated from that touch input. Some nonlimiting examples of such state data may include a direction indicated via the touch input, a speed of the touch input, a change in velocity over the touch input (e.g., slowing down or speeding up within a swipe), a change in direction over the touch input, or any other suitable factor associated with the touch input.

At 412, the process 400 may involve modifying the action determined at 406. For example, if, at 406 of the process 400, a determination is made that a movement action is to be performed by the avatar, the movement action may be modified at 412 based on the additional received state data. For example, upon determining (e.g., at 406) that a typical movement is to be performed, the additional state data may indicate instead that a special movement is to be performed instead. In this example, the special movement may replace the typical movement while being performed in the same direction as the typical movement would have been. At 414, the process 400 may involve executing the modified action.

Figure 5:
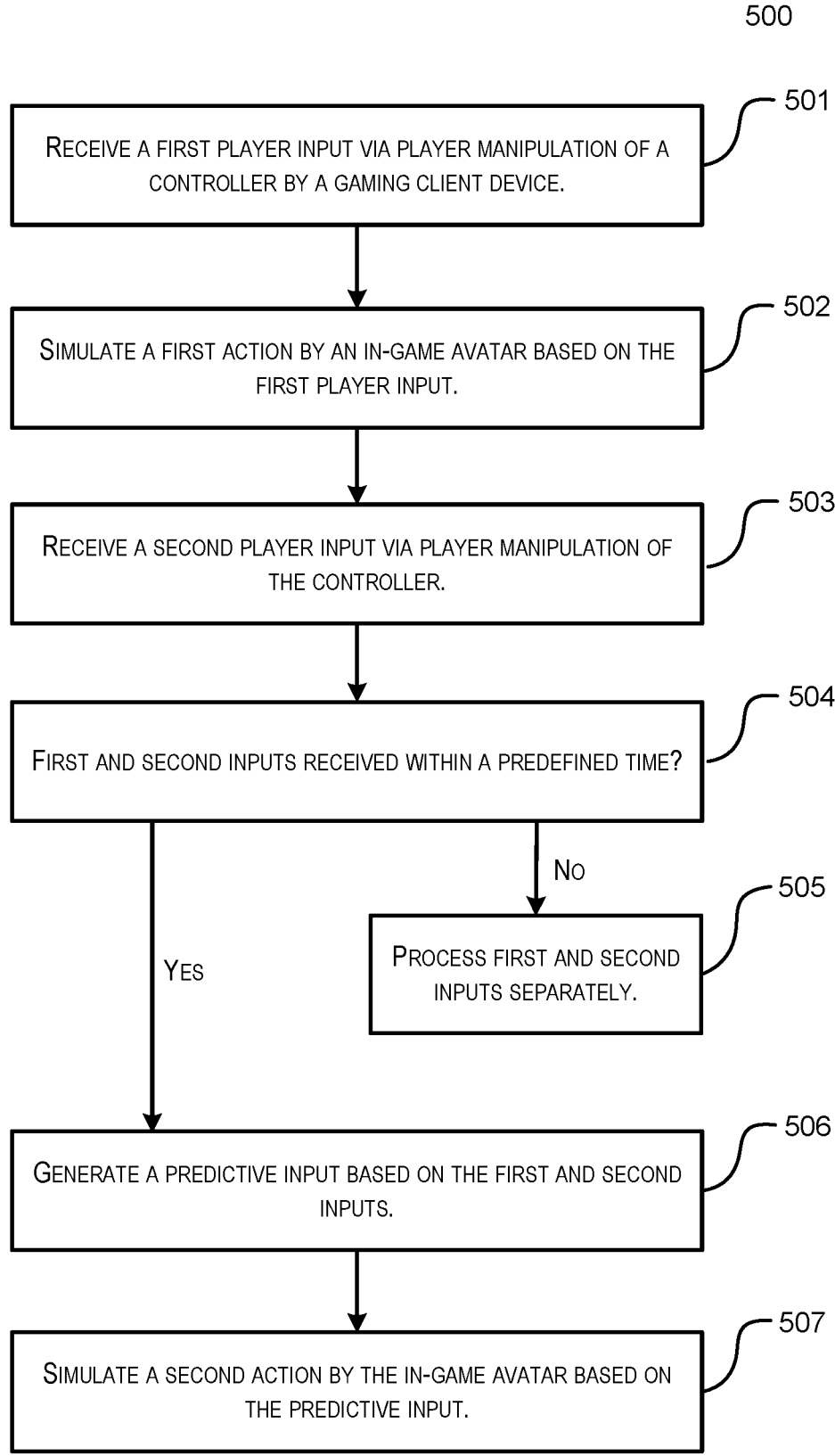
FIG. 5 is a process flow diagram illustrating an example process for networking controller data between a client and server machine for online gaming.

FIG. 5 is a process flow diagram illustrating an example process 500 for networking controller data between a client and server machine for online gaming. Process 500 can be performed under the control of a service environment or system like service environment 100 described with reference to FIG. 1.

According to various embodiments, the process 500 includes receiving a first player input via player manipulation of a controller on a gaming client device at 501. The game system then simulates a first action by an in-game avatar based on the first player input, typically without first syncing with the server, at 502. The system can then receive a second player input via manipulation of the controller at 503.

When the inputs are received within a predefined period of time at 504, the system can generate a predictive input based on the first and second inputs at 506. This predictive input differs from a result of either individual input in that rapid change of the raw input values received by the controller are tracked like inputs and stored in memory. The system can then simulate a second action by the in-game avatar based on the predictive input at 507, which may differ from the action that would be simulated based solely on the sequential execution of the first and second inputs. If, however, the first and second inputs are not received within the defined period of time at 504, the system can process the inputs separately and in series at 505.

Figure 6:
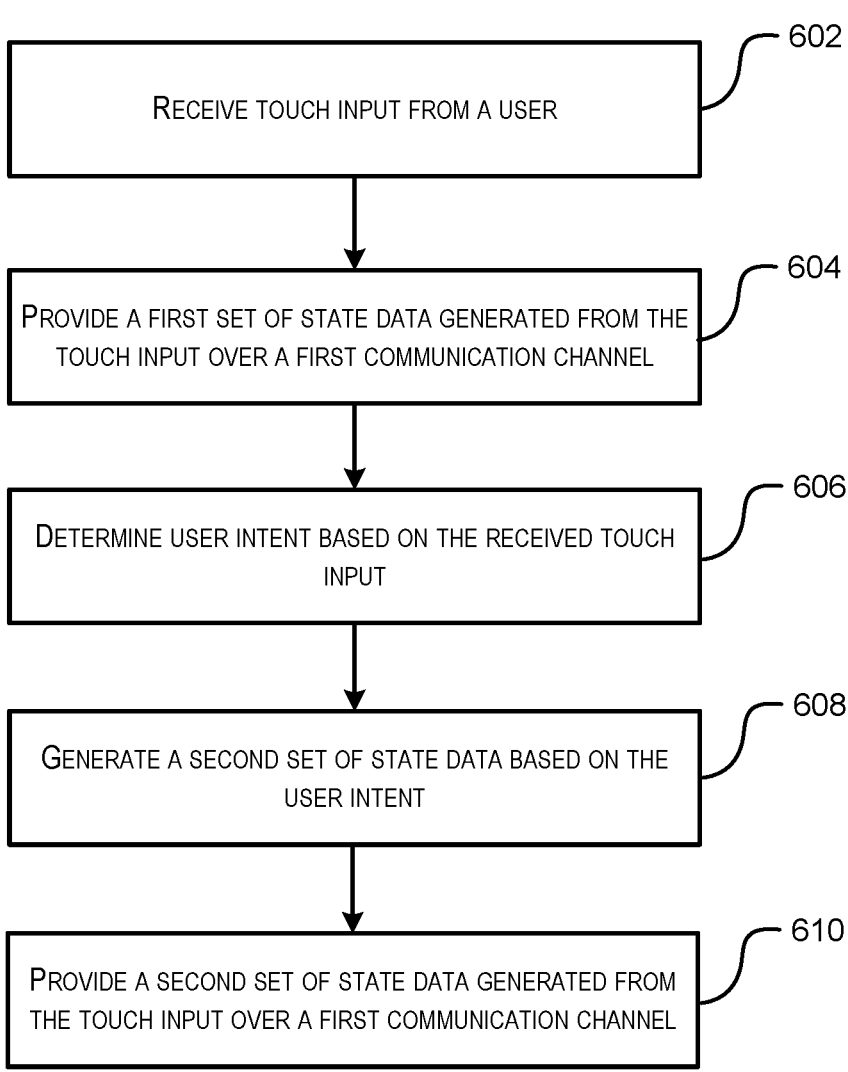
FIG. 6 depicts a flow diagram showing an example process flow for conveying state data between electronic devices in accordance with embodiments.

FIG. 6 depicts a flow diagram showing an example process flow 600 for conveying state data between electronic devices in accordance with embodiments. The process 600 may be performed by a computing device that is configured to generate activation data based on user input. For example, the process 600 may be performed by a controller capable of facilitating interaction between the user and a software application, such as the controller 302 described with respect to FIG. 3 above. In some embodiments, such a software application is a video game played by the user, and the controller is used to control an avatar in a video game. In some cases, the controller is a virtual controller having a touchscreen display.

At 602, the process 600 comprises receiving touch input from a user. In some embodiments, the touch input relates to an action to be performed by an avatar. In some embodiments, the touch input is associated with one or more input mechanisms implemented on the controller.

At 604, the process 600 comprises providing a first set of state data to a second electronic device over a first communication channel, the first set of state data generated from the received touch input. In some embodiments, the first set of state data comprises a predetermined set of data values. The second electronic device may be any suitable electronic device, such as a server computing device or a gaming console.

At 606, the process 600 comprises determining a user intent based on the received touch input. In some embodiments, the user intent comprises a modification to the action to be performed by the avatar. In some embodiments, the user intent comprises a second action to be performed subsequent to the action to be performed by the avatar. In some embodiments, the user intent is determined based on historic usage data for a user of the user device. In some cases, the user intent is determined by providing the touch input to a trained machine learning model.

At 608, the process 600 comprises generating a second set of state data based on the determined user intent. In some embodiments, the second set of state data comprises a set of data values selected based on the user intent. In some embodiments, the second set of state data comprises some combination of at least one of an input vector, an input deflection, or an input change.

At 610, the process 600 comprises providing a second set of state data to the second electronic device over a second communication channel different from the first communication channel. In some embodiments, the second set of state data is used by the second electronic device to determine an action or an action modification to be performed by an avatar.

The methods described herein are directed to virtual controllers, i.e., controllers that use a touchscreen or touchscreen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as being essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following, further examples are described to facilitate understanding of aspects of the invention:

Example A. A method comprising:

receiving, at a user device, input from a user of the user device that relates to a first action to be performed by an avatar;

providing, to a second electronic device, a first set of state data generated from the received input over a first communication channel;

determining, based on the received input, a user intent that relates to a second action to be performed by the avatar that differs from the first action;

generating, based on the user intent, a second set of state data that is different from the first set of state data and including less than all available state data;

providing, to the second electronic device, the second set of state data over a second communication channel different from the first communication channel; and causing the avatar to perform a modified action that differs from the first action based on the first and second sets of state data.

Example B. The method of the preceding example, wherein the user intent comprises an interrupt that prevents the first action from being performed by the avatar.

Example C. The method of any of the preceding examples, wherein the user intent comprises a modification to the first action to be performed by the avatar.

Example D. The method of any of the preceding examples, wherein the user intent comprises a second action to be performed after the first action to be performed by the avatar.

Example E. The method of any of the preceding examples, wherein the first set of state data comprises a predetermined set of data values.

Example F. The method of any of the preceding examples, wherein the second set of state data comprises a set of data values selected based on the user intent.

Example G. The method of any of the preceding examples, wherein the second set of state data comprises some combination of at least one of an input vector, an input deflection, or an input change.

Example H. The method of any of the preceding examples, wherein the user intent is determined based on historic usage data for a user of the user device.

Example I. The method of any of the preceding examples, wherein the user intent is determined by providing the input to a trained machine learning model.

Example J. A user device comprising:

a processor; and a memory including instructions that, when executed with the processor, cause the user device to, at least:

receive, at a user device, input from a user of the user device that relates to a first action to be performed by an avatar;

provide, to a second electronic device, a first set of state data generated from the received input over a first communication channel;

determine, based on the received input, a user intent that relates to a second action to be performed by the avatar that differs from the first action;

generate, based on the user intent, a second set of state data that is different from the first set of state data and including less than all available state data;

provide, to the second electronic device, the second set of state data over a second communication channel different from the first communication channel; and cause the avatar to perform a modified action that differs from the first action based on the first and second sets of state data.

Example K. The user device of the preceding example, wherein the user device comprises a controller used to control an avatar in a video game.

Example L. The user device of any of the preceding examples, wherein the controller comprises a virtual controller having a touchscreen display.

Example M. The user device of any of the preceding examples, wherein the input is associated with one or more input mechanisms implemented on the controller.

Example N. The user device of any of the preceding examples, wherein the second electronic device comprises a gaming console.

Example O. The user device of any of the preceding examples, wherein the second electronic device comprises a server computing device.

Example P. The user device of any of the preceding examples, wherein the second set of state data is used by the second electronic device to cause the avatar to perform a second action after performing the first action.

Example Q. The user device of any of the preceding examples, wherein the second set of state data is used by the second electronic device to modify the first action to be performed by the avatar.

Example R. A non-transitory computer-readable media collectively storing computer-executable instructions that upon execution cause one or more computing devices to collectively perform acts comprising:

receiving, at a user device, input from a user of the user device that relates to a first action to be performed by an avatar;

providing, to a second electronic device, a first set of state data generated from the received input over a first communication channel;

determining, based on the received input, a user intent that relates to a second action to be performed by the avatar that differs from the first action;

generating, based on the user intent, a second set of state data that is different from the first set of state data and including less than all available state data;

providing, to the second electronic device, the second set of state data over a second communication channel different from the first communication channel; and causing the avatar to perform a modified action that differs from the first action based on the first and second sets of state data.

Example S. The non-transitory computer-readable media of the preceding example, wherein the user intent comprises one of: an interrupt that prevents the first action being performed by the avatar, a modification to the first action to be performed by the avatar, or a second action to be performed subsequent to the first action to be performed by the avatar.

Example T. The non-transitory computer-readable media of any of the preceding examples, wherein the first set of state data comprises a predetermined set of data values and the second set of state data comprises a set of data values selected based on the user intent.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method for controlling a server, the method comprising:

receiving, through a first communication channel between the server and a controller device, a first set of state data representing touch input received by the controller device;

determining a first type of action to be performed by an avatar based on the touch input, wherein determining the first type of action comprises using the first set of state data to select the first type of action from a set of actions available to be performed by the avatar;

receiving, through a second communication channel between the server and the controller device, a second set of state data representing an action intent that relates to a second type of action to be performed by the avatar, wherein the action intent is generated by a prediction model based on the touch input, wherein the prediction model is trained on historic gameplay action data; and modifying the first type of action based on the second set of state data, wherein the modifying the first type of action comprises replacing the first type of action with the second type of action when a movement associated with the second set of state data indicates a change from a movement associated with the first set of state data.

2. The method of claim 1, wherein the first type of action is modified in accordance with an interrupt that prevents the first type of action from being performed by the avatar.

3. The method of claim 1, wherein modifying the first type of action includes causing the avatar to perform the second type of action after the first type of action.

4. The method of claim 1, wherein the first set of state data includes a predetermined set of data values.

5. The method of claim 1, wherein the second set of state data includes a set of data values selected based on the action intent.

6. The method of claim 5, wherein modifying the first type of action is based on the set of data values.

7. The method of claim 1, wherein the second set of state data includes at least one of an input vector, an input deflection, or an input change.

8. The method of claim 1, wherein the historic gameplay action data is associated with a user of the controller device.

9. The method of claim 1, wherein the prediction model is trained by machine learning to correlate gameplay input to gameplay action for the avatar.

10. A server comprising:

a processor that executes instructions stored in memory, wherein the processor executes the instructions to:

receiving, through a first communication channel between the server and a controller device, a first set of state data representing touch input received by the controller device;

determining a first type of action to be performed by an avatar based on the touch input, wherein determining the first type of action comprises using the first set of state data to select the first type of action from a set of actions available to be performed by the avatar;

receiving, through a second communication channel between the server and the controller device, a second set of state data representing an action intent that relates to a second type of action to be performed by the avatar, wherein the action intent is by a prediction model based on the touch input, wherein the prediction model is trained on historic gameplay action data; and modify the first type of action based on the second set of state data, wherein the modifying the first type of action comprises replacing the first type of action with the second type of action when a movement associated with the second set of state data indicates a change from a movement associated with the first set of state data.

11. The server of claim 10, wherein the controller device is configured to control the avatar during gameplay of a video game.

12. The server of claim 11, wherein the controller device includes a virtual controller presented within a touchscreen display.

13. The server of claim 11, wherein the touch input is associated with one or more input mechanisms implemented on the controller device.

14. The server of claim 10, wherein the server includes a gaming console.

15. The server of claim 10, wherein the server includes a game server computing device.

16. The server of claim 10, wherein the second set of state data is used by the server to cause the avatar to perform the second type of action after performing the first type of action.

17. The server of claim 10, wherein the second set of state data is used by the server to modify the first type of action based on a set of data values selected in accordance with the action intent.

18. A non-transitory computer-readable storage media storing computer-executable instructions that upon execution by one or more processors cause a server to perform operations comprising:

receiving, through a first communication channel between the server and a controller device, a first set of state data representing touch input received by the controller device;

determining a first type of action to be performed by an avatar based on the touch input, wherein determining the first type of action comprises using the first set of state data to select the first type of action from a set of actions available to be performed by the avatar;

receiving, through a second communication channel between the server and the controller device, a second set of state data representing an action intent that relates to a second type of action to be performed by the avatar, wherein the action intent is generated by a prediction model based on the touch input, wherein the prediction model is trained on historic gameplay action data; and modifying the first type of action based on the second set of state data, wherein the modifying the first type of action comprises replacing the first type of action with the second type of action when a movement associated with the second set of state data indicates a change from a movement associated with the first set of state data.

19. The non-transitory computer-readable storage media of claim 18, wherein modifying the first type of action includes one or more of: an interrupt that prevents the first type of action being performed by the avatar, based on a set of data values selected in accordance with the action intent, or a second type of action to be performed subsequent to the first type of action.

20. The non-transitory computer-readable storage media of claim 18, wherein the first set of state data includes a predetermined set of data values and the second set of state data includes a set of data values selected based on the action intent.

* * * * *